United States Patent [19]

Matsuda et al.

[11] Patent Number: 4,721,343

[45] Date of Patent: Jan. 26, 1988

[54] HYDRAULIC BRAKING PRESSURE CONTROL APPARATUS FOR AN ANTI-LOCK BRAKING SYSTEM OF MOTOR VEHICLES

[75] Inventors: Shohei Matsuda, Utsunomiya; Yoshihiro Iwakawa, Haga; Makoto Sato, Kamifukuoka, all of Japan

[73] Assignee: Honda, Giken Kogyo Kabushiki Kaisha, Tokyo, Japan

[21] Appl. No.: 875,601

[22] Filed: Jun. 18, 1986

[30] Foreign Application Priority Data

Jun. 20, 1985 [JP] Japan ............... 60-93416[U]

[51] Int. Cl.$^4$ ................................ B60T 8/42
[52] U.S. Cl. .................... 303/6 C; 188/349; 303/115; 303/116; 303/119
[58] Field of Search ............ 303/115, 113, 116, 117, 303/119, 92, 61–63, 68–69, 6 C; 188/181, 151 A, 345, 349

[56] References Cited

U.S. PATENT DOCUMENTS

| | | | |
|---|---|---|---|
| 3,722,960 | 3/1973 | Menar ................................ | 303/115 |
| 4,500,138 | 2/1985 | Mizusawa et al. ............... | 303/115 X |
| 4,627,670 | 12/1986 | Matsuda et al. ................. | 303/115 |
| 4,641,893 | 2/1987 | Sato et al. ........................ | 303/92 X |

FOREIGN PATENT DOCUMENTS 60-234061 11/1985 Japan .
2023248 12/1979 United Kingdom .

Primary Examiner—Douglas C. Butler
Attorney, Agent, or Firm—Roberts, Spiecens & Cohen

[57] ABSTRACT

A hydraulic braking pressure control apparatus provided with a modulator for controlling the supply of control hydraulic pressure to a wheel brake of the vehicle, wherein a partition is provided between a first cylinder portion and a second cylinder portion which are formed in a casing, a first piston adapted to divide the first cylinder portion into an input hydraulic chamber on the partition side and a control chamber on the opposite side is secured to one end of a piston rod extending through the partition slidably and oil-tightly, and a second piston adapted to define an output hydraulic chamber on the partition side within the second cylinder portion is mounted on the other end of the piston rod for axial relative movement. The partition is provided with a valve mechanism capable of disconnecting communication between the input and output hydraulic chambers. The second piston is biased in a direction toward the partition, and by relative movement of the second piston with respect to the piston rod, the interior of the output hydraulic chamber is prevented from reaching an excessive negative pressure level during an anti-lock operation. The apparatus can function as a proportioning reducing valve by forming the first piston with a smaller diameter than the second piston.

17 Claims, 5 Drawing Figures

HYDRAULIC BRAKING PRESSURE CONTROL APPARATUS FOR AN ANTI-LOCK BRAKING SYSTEM OF MOTOR VEHICLES

BACKGROUND OF THE INVENTION

1. Field of the Invention

The present invention relates to a hydraulic braking pressure control apparatus for vehiclesy, and more particularly to a hydraulic braking pressure control apparatus for vehicles having an input hydraulic chamber communicating with an output port of a master cylinder, and an output hydraulic chamber communicating with a wheel brake and being adapted to generate a hydraulic braking pressure in accordance with a hydraulic pressure in the input hydraulic chamber, said apparatus having a hydraulic braking pressure modulator, wherein the volume of the output hydraulic chamber can be increased in accordance with the supply of a hydraulic control pressure to a control chamber when a wheel is about to become locked.

2. Description of the Prior Art

In a conventional hydraulic braking pressure control apparatus for vehicles, a piston is operated in response to the variation of a hydraulic pressure within an input hydraulic chamber so as to reduce the volume of an output hydraulic chamber and thereby generate a hydraulic braking pressure, in accordance with the pressure in the input hydraulic chamber, from the output hydraulic chamber. During an anti-lock operation, the piston is displaced in a direction opposite to that in the abovementioned case by means of a control liquid pressure supplied to a control chamber, to increase the volume of the output hydraulic chamber.

In the above conventional hydraulic braking pressure control apparatus, a hydraulic braking system is divided into two parts, one of them extending from the master cylinder to the input hydraulic chamber, and the other extending from the output hydraulic chamber to a wheel brake. Accordingly, when the hydraulic braking system is filled with hydraulic fluid, such as oil, it is required that those two parts be charged with the oil separately. Moreover, since the piston is in operation at all times during a braking operation, the number of its operation strokes is great. This may lead to deterioration of the durability of the control apparatus.

The assignee of the present invention has already proposed, for example, in Japanese Patent Application Laid-Open No. 234061/1985 Specification, a hydraulic control apparatus provided with a valve mechanism of a normally opening type in a partition located between input and output hydraulic chambers, which valve mechanism is adapted to disconnect the input and output hydraulic chambers from each other during an anti-lock operation, in order to integrate the hydraulic braking system into a single line extending from a master cylinder to a wheel brake, thereby facilitating a working oil charging operation, and to reduce the number of strokes of the piston to improve the durability of the control apparatus.

According to such a hydraulic control apparatus, the above-mentioned problems can be solved. However, when the vehicle runs on a bad road, or when anti-lock control is made excessively due to the trouble of an antilock control means, an abnormal increase of the hydraulic pressure in a control chamber causes the volume of the output hydraulic chamber to increase abnormally.

For this reason, a negative pressure may be developed in the hydraulic system between the output hydraulic chamber and the wheel brake to cause the generation of trapped air bubbles.

SUMMARY OF THE INVENTION

It is therefore a first object of the present invention to provide a hydraulic braking pressure control apparatus for vehicles, having a simple construction, which can prevent the volume of the output hydraulic chamber from abnormally increasing.

Generally, the load applied to the rear wheel of a vehicle when the wheel is braked is smaller than that of the front wheel, and thus the hydraulic braking pressure of the rear wheel brake is decreased through that amount. In conventional apparatuses, a proportional reducing valve has been used to decrease the hydraulic braking pressure.

It is a second object of the present invention to provide a hydraulic braking pressure control apparatus for vehicles of an extremely simple construction in which a hydraulic braking pressure modulator can function as a proportional reducing valve, in addition to the effect obtained by the aforementioned first aspect with such circumstances in view.

For achieving the above-described first object, in accordance with the present invention, there is provided a hydraulic braking pressure control apparatus for vehicles provided with a hydraulic braking pressure modulator, said apparatus comprising a partition located in a cylinder bore formed in a casing to divide said cylinder bore into a first cylinder portion and a second cylinder portion, the first cylinder portion having therein a first piston slidably fitted to define an input hydraulic chamber on the partition side communicating with a master cylinder and a control chamber on an opposite side remote from the partition, the control chamber being capable of communicating with a control liquid pressure source, the second cylinder portion having a second piston slidably fitted therein and operatively connected to the first piston, the second piston defining an output hydraulic chamber on the partition side communicating with a wheel brake, said partition being provided with a valve mechanism adapted to disconnect communication between the input hydraulic chamber and the output hydraulic chamber in response to a displacement of the first piston toward the partition, characterized in that said first piston is secured to one of opposite ends of a piston rod which extends through the partition oil-tightly and movably, and said second piston is mounted axially relatively movably on the other end of said piston rod and biased towards the partition for relative movement to the partition.

In addition, for achieving the above-described second object, according to the present invention, there is provided a hydraulic braking pressure control apparatus for vehicles provided with a hydraulic braking pressure modulator, said apparatus comprising a partition located in a cylinder bore formed in a casing to divide said cylinder bore into a first cylinder portion and a second cylinder portion, the first cylinder portion having therein a first piston slidably fitted to define an input hydraulic chamber on the partition side communicating with a master cylinder and a control chamber on an opposite side remote from the partition, the control chamber being capable of communicating with a control liquid pressure source, the second cylinder portion having a second piston slidably fitted therein and operatively connected to the first piston, the second piston defining an output hydraulic chamber on the partition side communicating with a wheel brake, said partition being provided with a valve mechanism adapted to disconnect communication between the input hydraulic chamber and the output hydraulic chamber in response to a displacement of the first piston toward the partition, characterized in that said first piston is formed with a smaller diameter than that of the second piston and secured to one of opposite ends of a piston rod which extends through the partition oil-tightly and movably, and said second piston is mounted axially relatively movably on the other end of said piston rod and biased towards the partition for relative movement to the partition.

According to the first arrangement, since the first piston is secured to one end of the piston rod which extends through the partition oil-tightly and movably whereas the second piston is mounted on the other end of the piston rod for axial relative movement and biased for relative movement towards the partition, the second piston is relatively displaced with respect to the piston rod in such a manner that a force in a direction to move the second piston away from the partition by hydraulic pressure in the output hydraulic chamber and a biasing force urging the piston in a direction toward the partition may be balanced. For this reason, even if the liquid pressure in the control chamber abnormally increases, the volume of the output hydraulic chamber is kept from abnormally increasing and the interior of the output hydraulic chamber is prevented from lowering to such a negative pressure of practically inconvenient level.

According to the second arrangement, in addition to the first arrangement, the first piston is made smaller in diameter than that of the second piston. Therefore, in addition to the advantages obtainable by the afore-mentioned first aspect, it is possible to allow the hydraulic braking pressure modulator to function as a proportional reducing valve. Thus, in a hydraulic braking pressure control apparatus of the type which requires provision of a proportional reducing valve, by employing a hydraulic braking pressure modulator according to the present invention, a separate proportional reducing valve can be eliminated. Furthermore, in case of a hydraulic braking pressure control apparatus which would require no proportional reducing valve, if a hydraulic braking pressure modulator according to the invention is used, the possibility of wheel-lock decreases even when a failure occurs in the liquid pressure of a control liquid pressure source.

The above and other objects, features and advantages of the invention will become apparent from reading of the following description taken in conjunction with the accompanying drawings of preferred embodiments of the present invention.

BRIEF DESCRIPTION OF THE DRAWINGS

FIGS. 1, 2, 3 and 4 show one embodiment of the present invention; in which FIG. 1 is a flow diagram showing the whole hydraulic pressure system of a hydraulic braking pressure control apparatus for vehicles, FIG. 2 is a plan view of the apparatus, FIG. 3 is an enlarged sectional view taken on line III—III in FIG. 2, and FIG. 4 is a sectional view taken on line IV—IV in FIG. 3.

DESCRIPTION OF THE PREFERRED EMBODIMENTS

Figure 1:
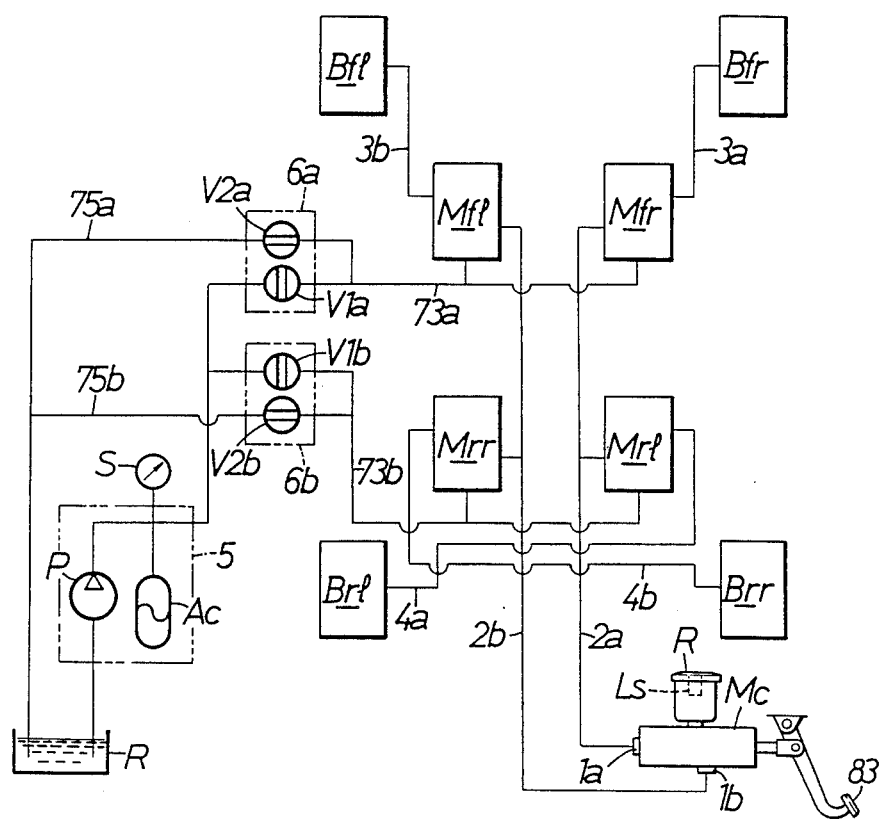

In the following, several embodiments of the present invention will be described in conjunction with the accompanying drawings. Referring first to FIG. 1 showing a first embodiment of the present invention, a tandem master cylinder Mc having a reservoir R provided with a liquid level alarm sensor Ls has a pair of output ports $1a$ and $1b$ to which an connected oil passages $2a$, $2b$, respectively. Output hydraulic pressure from one output port $1a$ is supplied through the oil passage $2a$ to a hydraulic braking pressure modulator for a right front wheel Mfr and a hydraulic braking pressure modulator for a left rear wheel Mrl, and output hydraulic pressure from the other output port $1b$ is supplied through the oil passage $2b$ to a hydraulic braking pressure modulator for a left front wheel Mfl and a hydraulic braking pressure modulator for a right rear wheel Mrr. The left and right wheel hydraulic braking pressure modulators Mfl, Mfr function so as to apply the hydraulic braking pressure corresponding to the output hydraulic pressure of the master cylinder Mc to brakes for left and right wheels Bfl, Bfr, whereas the left and right wheel hydraulic braking pressure modulators Mrl, Mrr function so as to apply the hydraulic braking pressure with the output hydraulic pressure of the master cylinder Mc proportionally reduced to brakes for left and right wheels Brl, Brr.

In order to lower the hydraulic braking pressure when each wheel is about to be locked, anti-lock control valve means $6a$, $6b$ are interposed between a control liquid pressure source 5 and the reservoir R, and the left and right wheel hydraulic braking pressure modulators Mfl, Mfr and left and right wheel hydraulic braking pressure modulators Mrl, Mrr. More specifically, the anti-lock operation of the left and right hydraulic braking pressure modulators Mfl, Mfr is controlled by the operation of one anti-lock control valve means $6a$ whereas the anti-lock operation of the left and right rear wheel hydraulic braking pressure modulators Mrl, Mrr is controlled by the operation of the other anti-lock control valve means $6b$.

Figure 2:
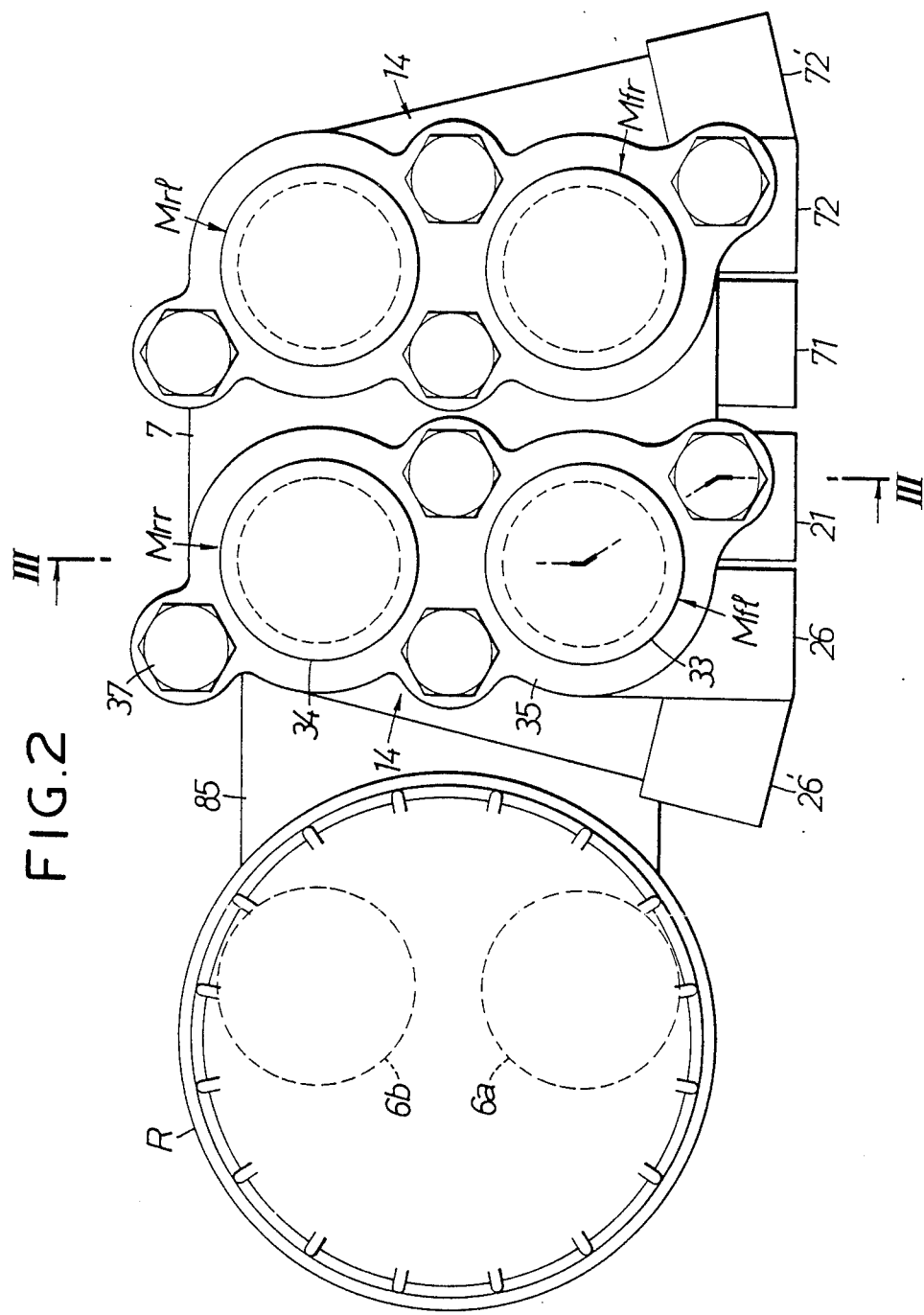

In FIG. 2, the hydraulic braking pressure modulators Mfl, Mfr, Mrl, and Mrr are provided within a common casing 7. The left and right front wheel hydraulic braking pressure modulators Mfl, Mfr and the left and right rear wheel hydraulic braking pressure modulators Mrl, Mrr are arrayed parallel to each other. The hydraulic braking pressure modulators Mfl, Mfr, Mrl, Mrr are arrayed so that the hydraulic braking pressure modulators under one and the same hydraulic pressure system, that is, the right front wheel hydraulic braking pressure modulator Mfr and left rear wheel hydraulic braking pressure modulator Mr which receive the supply of hydraulic pressure from one output port $1a$ of the master cylinder Mc, and the left front wheel hydraulic braking pressure modulator Mfl and right rear wheel hydraulic braking pressure modulator Mrr may be located adjacent to each other on a parallel straight line. One anti-lock control valve means $6a$ is arranged on the extension of a straight line connecting the left and right front wheel hydraulic braking pressure modulators Mfl, Mfr, and the other anti-lock control valve means 6b is arranged on the extension of a straight line connecting the left and right rear wheel hydraulic braking pressure modulators Mrl, Mrr. Both the antilock control valve means 6a, 6b are integrally supported on a mounting portion 85 provided on the side of the casing 7, and the revervoir R is disposed above the antilock control valve means 6a, 6b.

The hydraulic braking pressure modulators Mfl, Mfr, Mrl, Mrr extend vertically and are arranged parallel to each other. The left and right front wheel hydraulic braking pressure modulators Mfl, Mfr basically have the same construction, and the left and right rear wheel hydraulic braking pressure modulators Mrl, Mrr are basically the same in construction as that of the aforesaid left and right front wheel hydraulic braking pressure modulators Mfl, Mfr except in a portion thereof. Therefore, in the following, the construction of the left front wheel hydraulic braking pressure modulator Mfl will be described in detail, and as for the right rear wheel hydraulic braking pressure modulator Mrr, only the portion thereof different from the left and right front wheel hydraulic braking pressure modulators Mfl, Mfr will be described. Essential parts of the modulator Mrr corresponding to the left front wheel hydraulic braking pressure modulator Mfl will merely be shown with the same reference numeral affixed thereto.

Figure 3:
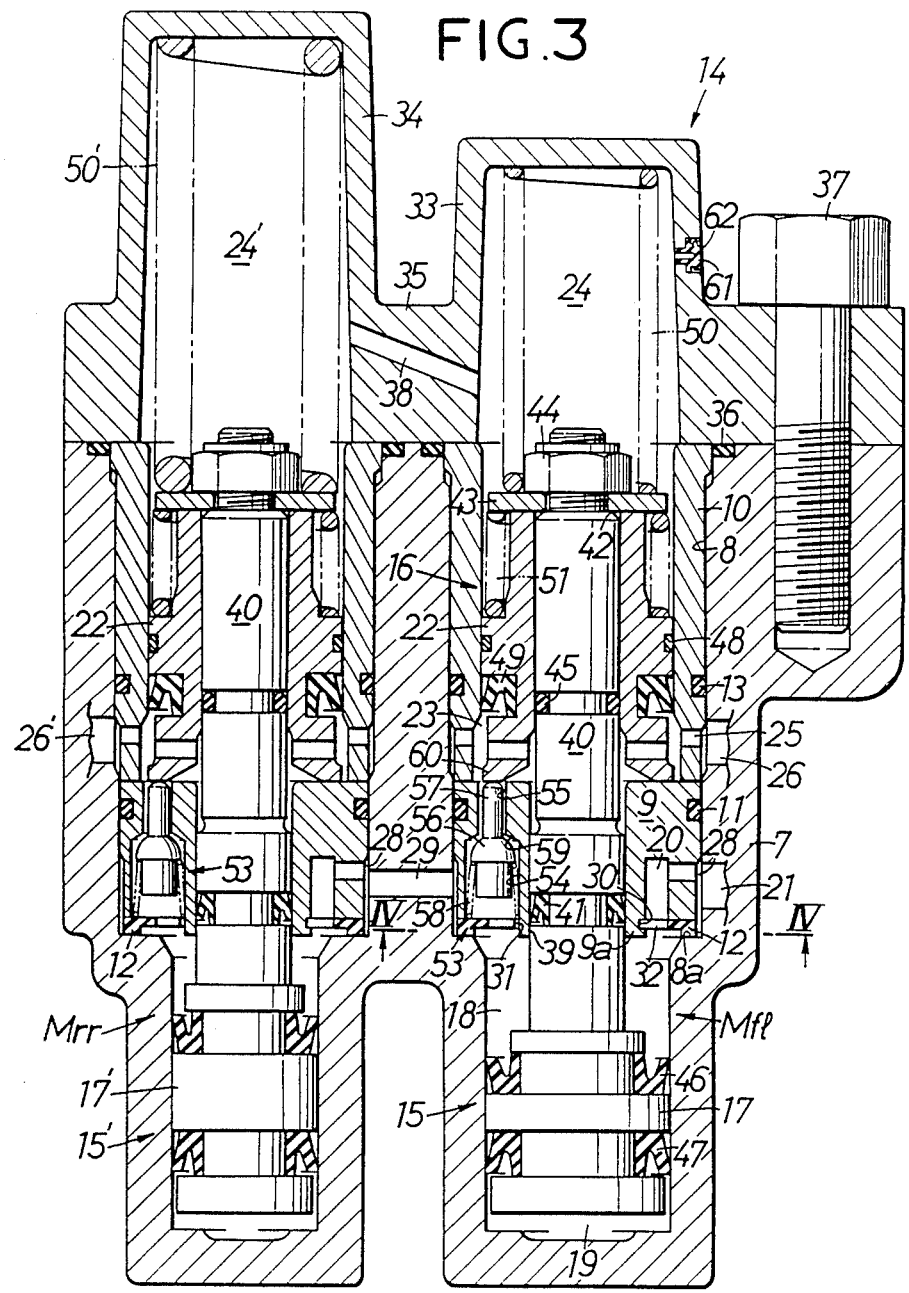

In FIG. 3, the left front wheel hydraulic braking presure modulator Mfl is constructed such that components thereof are incorporated from the top into a cylinder bore 8 formed in the casing 7 and having a closed bottom and an open top. More specifically, a resilient member 12, a disk-like partition 9 and a cylindrical sleeve 10 are inserted into the cylinder bore 8. The partition 9 is inserted into the cylinder bore 8 with an O-ring 11 engaging the inner surface of the cylinder bore 8, and the sleeve 10 is inserted into the cylinder bore 8 with an O-ring 13 engaging the inner surface of the cylinder bore 8. An upwardly directed shoulder 8a is provided in the cylinder bore 8. A cover member 14 is mounted on the casing 7 corresponding to the open end of the cylinder bore 8, and the resilient member 12, the partition 9 and the sleeve 10 are pressed between and secured to the cover member 14 and the shoulder 8a. It is noted that the sleeve 10 can be formed integral with the partition 9.

Figure 4:
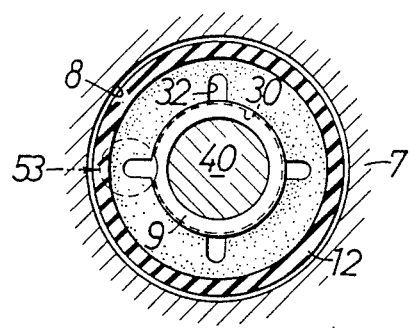

In FIG. 4, the resilient member 12 is formed into a disk-like configuration from plastics, rubber or the like. A small-diameter cylindrical portion 9a extends from partition 9 in a direction opposite sleeve 10 and an engaging groove 30 is provided over the entire circumference of the outer surface at the end of the small-diameter cylindrical portion 9a. A through-hole 31 having a peripheral edge engageable with the engaging groove 30 is provided in the central portion of the resilient member 12.

In the inner peripheral edge of the resilient member 12 there are provided notches 32 located at a plurality of spaced positions, and the inner edge of the resilient member 12 may be flexed into engagement with the engaging groove 30 by the provision of the notches 32. If an inlet oil passage 21 is formed in the casing 7 at a portion facing an input hydraulic chamber 18, a useless portion is created between the passage 21 and the partition 9, which leads to inconveniences in that the hydraulic braking pressure modulator Mfl becomes lengthened and in addition, air tends to enter between the inlet oil passage 21 and the partition 9. However, where the resilient member 12 is engaged with the partition 9, if the notches 32 are provided, the inlet oil passage 21 may be disposed at a position corresponding to the partition 9 to overcome the aforesaid inconveniences.

When the partition 9 and the sleeve 10 are locked within the cylinder bore 8, a first cylinder portion 15 located below the partition 9 and a second cylinder portion 16 located above the partition 9 are concentrically formed within the casing 7.

A first piston 17 is slidably fitted within the first cylinder portion 15, an input hydraulic chamber 18 is defined between the first piston 17 and the partition 9, and a control chamber 19 is defined between the bottom of the casing 7 and the first piston 17.

An annular oil passage 28 is defined between the lower outer surface of the partition 9 and the inner surface of the cylinder bore 8, and an annular oil passage 20 is formed in the partition 9 so as to provide communication between the input hydraulic chamber 18 and annular oil passage 28, the annular oil passage 20 being communicated with the input hydraulic chamber 18 through the notches 32.

The casing 7 is further formed with an inlet oil passage 21 which is opened at the side of the left front wheel hydraulic braking pressure modulator Mfl and is in communication with the annular oil passage 28. The right rear wheel hydraulic braking pressure modulator Mrr is also likewise provided with an annular oil passage 28, which is communicated with the annular oil passage 28 of the left front wheel hydraulic braking pressure modulator Mfl through a communication passage 29, which is formed in the casing 7 on the extension of the axis of the inlet oil passage 21. Accordingly, when machining the casing 7, the inlet oil passage 21 and the communication passage 29 are simultaneously formed. Moreover, an oil passage 2b communicating with output port 1b of the master cylinder Mc is connected to the open end of the inlet oil passage 21. Accordingly, output hydraulic pressure of the output port 1b is supplied to the input hydraulic chamber 18 of both the hydraulic braking pressure modulators Mfl, Mrr.

A second piston 22 having the same diameter as that of the first piston 17 is slidably fitted within the second cylinder portion 16, an output hydraulic chamber 23 is defined between the second piston 22 and the partition 9, and a spring chamber 24 serving as an air chamber is defined between the second piston 22 and the cover member 14. An oil passage 25 is formed in the sleeve 10 so as to communicate with the output hydraulic chamber 23 all the time, and an outlet oil passage 26, which is formed in the side wall of the casing 7 so as to connect oil passage 3b (see FIG. 1) with the left front wheel hydraulic braking pressure modulator Mfl, is brought into communication with the output hydraulic chamber 23 through oil passage 25. The outlet oil passage 26 is opened to the side of the casing 7 at the same side as that of the inlet oil passage 21.

The cover member 14 is common to the left front wheel hydraulic braking pressure modulator Mfl and the right rear wheel hydraulic braking pressure modulator Mrr, and the open ends of cup-shaped cylindrical portions 33, 34 corresponding to both the modulators Mfl, Mrr are connected by a flange portion 35. The cover member 14 is coupled to the upper end of the casing 7 by means of a plurality of bolts 37 with an O-ring 36 interposed between the open ends of the cylinder bores 8. Within both the cylindrical portions 33, 34, that is, spring chamber 24 of the left front wheel hydraulic braking pressure modulator Mfl and a spring chamber 24' of the right rear wheel hydraulic braking pressure modulator Mrr are connected to each other through a communication hole 38 between both the cylindrical portions 33 and 34.

A hole 39 is concentrically bored between the input hydraulic chamber 18 and the output hydraulic chamber 23 in the center of the partition 9, and a piston rod 40 is axially movably inserted into the hole 39. A seal member 41 in sliding contact with the inner surface of the hole 39 is mounted on the outer surface of the piston rod 40.

The first piston 17 is integrally provided below the piston rod 40, and the second piston 22 is mounted above the piston rod 40 for axial relative movement. More specifically, an upwardly directed shoulder 42 is provided above the piston rod 40, and a receiving member 43 in contact with the shoulder 42 is secured to the upper end of the piston 40 by means of a nut 44. The second piston 22 is axially movable relative to the piston rod 40 between the receiving member 43 and the partition 9, and an O-ring 45 in sliding contact with the inner surface of the second piston 22 is mounted on the outer surface of the piston rod 40.

A pair of seal members 46, 47 in sliding contact with the inner surface of the first cylinder portion 15 are mounted in axially spaced relation on the outer surface of the first piston 17, and an O-ring 48 and a seal member 49 are mounted on the outer surface of the second piston 22 so that they may come into sliding contact with the inner surface of the second cylinder portion 16, i.e., the inner surface of the sleeve 10.

A first spring 50 is interposed between the receiving member 43 or the piston rod 40 and the cover member 14 whereby the piston rod 40 is biased downwardly, that is, in a direction where the first piston 17 is moved away from the partition 9, by the force of the first spring 50. A second spring 51, which creates the spring force so as to cause the second piston 22 to move relative to the partition 9, is interposed between the receiving member 43 or the piston rod 40 and the second piston 22, and a set load of this second spring 51 is set to be smaller than that of the first spring 50.

The partition 9 is provided with a valve mechanism 53 to selectively provide a communication and disconnection between the input hydraulic chamber 18 and the output hydraulic chamber 23. This valve mechanism 53 includes a valve chamber 54 provided in the partition 9 communicating with the input hydraulic chamber 18, a valve port 55 between the valve chamber 54 and the output hydraulic chamber 23, a spherical valve body 56 encased within the valve chamber 54 so as to open and close the valve port 55, a driving rod 57 integral with the valve body 56 and extending through the valve port 55 and facing into the output hydraulic chamber 23, and a spring 58 encased within the valve chamber 54 to bias the valve body 56 toward the valve port 55. A conical valve seat 59, gradually reduced in diameter toward the valve port 55 is provided at the end of the valve chamber 54 adjacent to the valve port 55. The length of the driving rod 57 is sufficient to move the valve body 56 away from the valve seat 59 by being pressed by a pressing member 60 provided on the second piston 22 when the second piston 22 has been displaced a
maximum toward the partition 9.

In this valve mechanism 53, the spring 58 is supported on the resilient member 12, and the valve chamber 54 is brought into communication with the input hydraulic chamber 18 through the notches 32 in the resilient member 12 and the annular oil passage 20.

For the second piston 22, a check valve 61 serving as a leak-out means is provided on the cylindrical portion 33 of the cover member 14 in order that if a seal failure between the output hydraulic chamber 23 and the spring chamber 24, that is, a seal failure of the O-ring 48 and seal member 49 should occur, working oil leaked into the spring chamber 24 is discharged externally. This check valve 61 is forced from the outside into an outflow hole 62 formed in the side wall of the cylindrical portion 33 whereby when pressure within the spring chamber 24 exceeds a predetermined value, the check valve 61 is disengaged from the outflow hole 62 to allow outflow of the working oil while the check valve 61 normally functions to impede entry of water and dust into the spring chamber 24. Since the spring chambers 24, 24' are connected to each other through the communication hole 38, a further leak-out means need not be provided on the cylindrical portion 34.

In connection with the right rear wheel hydraulic braking pressure modulator Mrr, first piston 17' is
smaller in diameter than that of the second piston 22, and the inside diameter of first cylinder portion 15' is decreased accordingly. Furthermore, set load of a first spring 50' is set to be greater than that of the first spring 50 of the left front wheel hydraulic braking pressure modulator Mfl, and the first spring 50' is lengthened as compared to the first spring 50. The cylindrical portion 34 of the cover member 14 is lengthened as compared to the cylindrical portion 33 accordingly.

An outlet oil passage 26' of the right rear wheel hydraulic braking pressure modulator Mrr is adjacent to the outlet oil passage 26 of the left front wheel hydraulic braking pressure modulator Mfl and is opened to the side of the casing 7, and the oil passage 4b in communication with the right rear wheel brake Brr (see FIG. 1) is connected to the outlet oil passage 26'.

Other constructions of the right rear wheel hydraulic braking pressure modulator Mrr are basically the same as those of the left front wheel hydraulic braking pressure modulator Mfl.

The right front wheel hydraulic braking pressure modulator Mfr and the left rear wheel hydraulic braking pressure modulator Mrl are also constructed similarly as described above. An inlet oil passage 71 in communication with the annular oil passage 28 of the right front wheel hydraulic braking pressure modulator Mfr and outlet oil passages 72, 72' in communication with the output hydraulic chambers 23, respectively, of both the hydraulic braking pressure modulators Mfr, Mrl are opened to the side of the casing 7 similarly to the aforementioned inlet oil passage 21 and outlet oil passages 26, 26'. An oil passage 2a is connected to the inlet oil passage 71, and oil passages 3a, 4a are connected to the outlet oil passages 72, 72', respectively.

Turning again to FIG. 1, the control liquid pressure source 5 is composed of a hydraulic pump P for pumping a control liquid, for example, a working oil, from the reservoir R and an accumulator Ac, the hydraulic pump P being driven as necessary during the running of the vehicle. The control liquid pressure source 5 is provided with a hydraulic sensor S for detecting trouble and hydraulic failure of the hydraulic pump P and a start and stop for the driving of the hydraulic pump P.

The anti-lock control valve means 6a, 6b are composed of normally closed first electromagnetic valves V1a, V1b and normally opened second electromagnetic valves V2a, V2b, and when a wheel is about to be locked, the first electromagnetic valves V1a, V1b are driven to be opened whereas the second electromagnetic valves V2a, V2b are driven to be closed.

The first electromagnetic valves V1a, V1b are provided in a supply oil passage 73a in communication with the control chambers 19 of the left and right front wheel hydraulic braking pressure modulators Mfl, Mfr and a supply oil passage 73b in communicatin of the control chambers 19 of the left and right rear wheel hydraulic braking pressure modulators Mrl, Mrr. The second electromagnetic valves V2a, V2b are provided in return oil passages 75a, 75b branched from the supply oil passages 73a, 73b and returning to the reservoir R between the first electromagnetic valves V1a, V1b and the control chamber 19.

Next, the operation of the aforementioned embodiment will be described. First, the operation of both the front wheel hydraulic braking pressure modulators Mfl, Mfr will be described. In the normal operating state and when no brake is applied, i.e. brake pedal 83 is not operated, the piston rod 40 is moved downwardly by the force of the first spring 50, and the second piston 22 is in contact with the partition 9. Therefore, in the valve mechanism 53, the driving rod 57 is pressed by the pressing portion 60 of the second piston 22, and the valve body 56 is moved away from the valve seat 59 to an open position. Thus, a hydraulic circuit is formed from the output ports 1a, 1b of the master cylinder Mc to the brakes Bfl, Bfr through the input hydraulic chamber 18, the valve chamber 54, the valve port 55, the output hydraulic chamber 23, the oil passage 25, the output oil passages 26, 71 and the oil passages 3a, 3b. Thereby the charging of the working oil in the brake hydraulic circuit may be accomplished very easily likewise the brake hydraulic device not provided with a hydraulic braking pressure control apparatus for antilock control.

When the braking operation is effected by the brake pedal 83, the braking hydraulic pressure is supplied from the output ports 1a, 1b of the master cylinder Mc to both the brakes Bfl, Bfr via the aforesaid hydraulic circuit. Since at that time, the control liquid pressure from the control liquid pressure source 5 is not supplied to the control chamber 19, the second piston 22 remains displaced at the maximum on the partition 9 by means of the force of the first spring 50, and the valve mechanism 53 remains open.

When a wheel is about to be locked due to excessive braking force resulting from the braking operation, the second electromagnetic valve V2a closes and the first electromagnetic valve 1a opens, and therefore, the antilock control liquid pressure from the control liquid pressure source 5 is supplied to the control chamber 19. Thereby the first piston 17 and the piston rod 40 are moved upward against the downward force of the first spring 50 and the hydraulic pressure of the input hydraulic chamber 18. At that time, the second piston 22 is moved upward together with the piston rod 40 in a state where it contacts the receiving member 43 until the upwardly acting force due to the hydraulic pressure of the output hydraulic chamber 23 and the downwardly acting force due to the second spring 51 are balanced. With this, the second piston 22 is moved away from the partition 9 and therefore the valve body 56 of the valve mechanism 53 seats on the valve seat 59 to assume its closed position, thus disconnecting the supply of braking hydraulic pressure to both the brakes Bfl, Bfr and increasing the volume of the output hydraulic chamber 23. As a result, the braking hydraulic pressure decreases to prevent the wheel from being locked.

Both the rear wheel hydraulic braking pressure modulators Mrl, Mrr basically function similarly to the aforesaid front wheel hydraulic braking pressure modulators Mfl, Mfr. But, since the pressure receiving area of the first piston 17' is smaller than that of the second piston 22 and the set load of the first spring 51' is great, it is possible to release the braking hydraulic pressure reduced proportional to the hydraulic pressure of the input hydraulic chamber 18 from the output hydraulic chamber 23, which exhibits the function as a proportional reducing valve. Accordingly, the output hydraulic pressure of the master cylinder Mc is proportionally reduced and supplied to both the rear wheel brakes Brl, Brr.

In such a hydraulic braking pressure control apparatus for vehicles, each of the modulators Mfl, Mfr, Mrl, Mrr may be assembled by inserting, in order, the partition 9 with the resilient member 12 engaged, and the sleeve 10 into the cylinder bore 8 from the open end thereof, and coupling the cover member 14 to the casing 7. With this, the partition 9 and the sleeve 10 may be urged against the shoulder 8a through the resilient member 12. In this case, even if dimensional precision such as the length of the cylinder bore 8 and the axial lengths of the partition 9 and sleeve 10 are relatively rough, such an error in dimension is accommodated as the resilient member 12 is compressed. Accordingly, even if the axial lengths of the partition 9 and sleeve 10 are not in coincidence with the distance between the cover member 14 and the shoulder 8a so that the former are excessively longer or shorter than the latter, the partition 9 and the sleeve 10 are positively locked by a proper pressing force through an adequate flexure of the resilient member 12. Since the resilient member 12 is engaged with the partition 9, it can be easily inserted into the cylinder bore 8, and it also performs the function of supporting the spring 58 in the valve mechanism 53, thus reducing the number of parts necessary.

It is to be noted that the resilient member 12 may be interposed between the sleeve 10 and the cover member 14 or between the sleeve 10 and the partition 9, in a way different from the previously mentioned embodiment.

Assume now that in the second piston 22, the working oil leaks from the output hydraulic chamber 23 to the spring chambers 24, 24' due to failure of the O-ring 48 and seal member 49. In this case, when the pressure within the spring chambers 24, 24' exceeds a predetermined value, the check valve 61 is disengaged from the outflow hole 62 to cause the working oil to leak outside, and therefore, the liquid level alarm sensor Ls usually mounted on the reservoir R may be actuated to indicate failure of the seal.

Furthermore, the cover members 14 of the left front wheel and right rear wheel hydraulic braking pressure modulators Mfl, Mrr and the right front wheel and left rear wheel hydraulic braking pressure modulators Mfr, Mrl, which are under one and the same braking hydraulic system, are given commonality, (in the illustrated embodiment, the cover members are two in total) whereby the number of parts may be reduced to facilitate assembly. Moreover, since the cylindrical portion 34 on the side of the rear wheel hydraulic braking pressure modulators Brr, Brl is lengthened along with the first spring 50', it is possible to easily discriminate which is the rear wheel hydraulic braking pressure modulators Brr, Brl.

Figure 5:
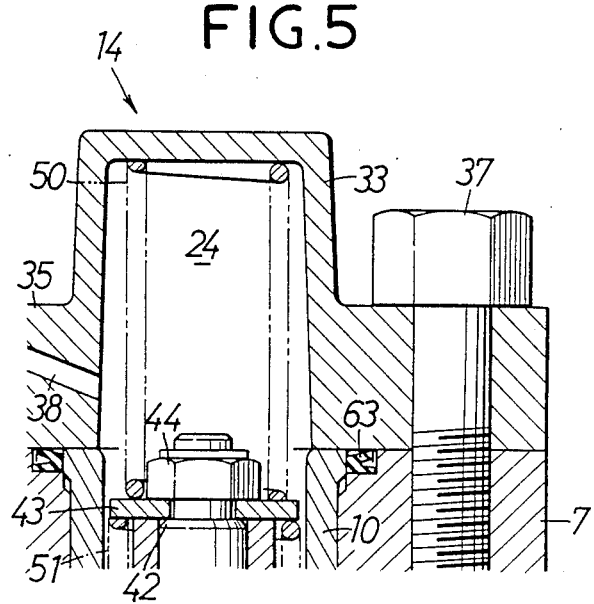
FIG. 5 is a longitudinal sectional view showing the esential parts of a further embodiment according to the present invention.

FIG. 5 shows a second embodiment of the present invention, which is provided in a mating surface between the cover member 14 and the casing 7 with a unidirectional cup-like seal member 63 as a leak-out means which allows outflow of working oil from the spring chamber 24 to the outside but impeding entry of water and dust from the outside into the spring chamber 24. In this manner, the check valve 61 used in the aforementioned first embodiment need not be provided but the effect similar to the check valve 61 can be obtained.

What is claimed is:

1. In a hydraulic braking pressure control apparatus for vehicles provided with a hydraulic braking pressure modulator, said apparatus comprising a partition located in a cylinder bore formed in a casing to divide said cylinder bore into a first cylinder portion and a second cylinder portion, the first cylinder portion having therein a first piston slidably fitted to define an input hydraulic chamber on the side facing the partition communicating with a master cylinder and a control chamber on an opposite side remote from the partition, the control chamber being capable of communicating with a control liquid pressure source, the second cylinder portion having a second piston slidably fitted therein and operatively connected to the first piston, the second piston defining an output hydraulic chamber on the side facing the partition communicating with a wheel brake, said partition being provided with a valve mechanism adapted to disconnect communication between the input hydraulic chamber and the output hydraulic chamber in response to a displacement of the first piston toward the partition, the improvement comprising a piston rod having opposite ends, said piston rod extending through said partition in sealed movable relation, said first piston being secured to one of said opposite ends of said piston rod, said second piston being mounted axially relatively movably on the other end of said piston rod and means axially biassing said second piston towards said partition.

2. The improvement as claimed in claim 1 wherein said first piston has a smaller diameter than the diameter of said second piston.

3. The improvement as claimed in claim 2 wherein said wheel brake is a rear wheel brake.

4. The improvement as claimed in claim 1 comprising a spring with a receiving member secured to said other end of said piston rod and engaging said second piston on a side thereof opposite said output hydraulic chamber.

5. The improvement as claimed in claim 1 wherein said hydraulic braking modulator comprises a modulator unit for a front wheel and a modulator unit for a rear wheel, and the first piston of the rear wheel modulator unit has a smaller diameter than that of the second piston whereas the first piston for the front wheel modulator unit has the same diameter as that of the second piston.

6. The improvement as claimed in claim 1 or 2 wherein said casing accommodates a plurality of adjacent hydraulic braking modulators having parallel axes, the input hydraulic chambers of said modulators being connected to each other by a communication passage aligned along an axis of an input oil passage connecting said master cylinder with one of said input hydraulic chambers.

7. The improvement as claimed in claim 1 or 2 wherein an air chamber is defined on a side of said second piston opposite said output hydraulic chamber, said master cylinder having a reservoir and including a liquid level alarm sensor, said air chamber including a leak-out means for allowing external discharge of working oil from said air chamber.

8. The improvement as claimed in claim 7 comprising a cover member enclosing said air chamber, said leak-out means comprising a check valve in said cover member.

9. The improvement as claimed in claim 7 comprising a cover member enclosing said air chamber and having mating surfaces with said casing, said leak-out means comprising a seal member at said mating surfaces between said cover member and said casing.

10. The improvement as claimed in claim 8 wherein said leakout means is disengaged from its mounted position when the pressure within said air chamber exceeds a predetermined value.

11. The improvement as claimed in claim 1 or 2 wherein said second cylinder portion has an open end, a cover member closing said open end, said first and second cylinder portions being connected to each other and providing a shoulder facing said open end and supporting said partition, a sleeve on said partition slidably receiving said second piston, said sleeve and partition being pressed and fixed between said shoulder and said cover member, and a resilient member disposed between the shoulder, the partition, the sleeve and the cover member.

12. The improvement as claimed in claim 11 wherein said resilient member is engaged with the partition and interposed between the partition and said shoulder.

13. The improvement as claimed in claim 12 wherein said resilient member has radial notches therein.

14. The improvement as claimed in claim 13 wherein two modulators are disposed in parallel, adjacent relation in said casing, the input hydraulic chambers of the two modulators being in communication with one another, said casing having an input passage connecting one of the input hydraulic chambers to the master cylinder, the other input chamber being in communication with said one input chamber via said notches in said resilient member.

15. The improvement as claimed in claim 1 or 2 wherein four braking pressure modulators, corresponding to four wheels of the vehicle, are provided in said casing, the input hydraulic chambers of the hydraulic braking pressure modulators being arranged in pairs in adjacent parallel relation in said casing, each pair being connected to a respective common output port of said master cylinder, and a cover member on said casing for each pair of modulators.

16. The improvement as claimed in claim 15 wherein each cover member defines a spring chamber above each respective second piston accommodating a respective axial biassing means.

17. The improvement as claimed in claim 16 wherein the spring chambers of the modulators of each pair are of different height.

* * * * *